INVENTORS
HAROLD JOHN CARL BJÖRK
SVEN GUSTAV INGEMAR KILANDER
BY
Kane and Nydick
ATTORNEYS INVENTORS
HAROLD JOHN CARL BJÖRK
SVEN GUSTAV INGEMAR KILANDER
BY
Hane and Nydick
ATTORNEYS INVENTORS
HAROLD JOHN CARL BJÖRK
SVEN GUSTAV INGEMAR KILANDER
BY Hane and Nydick
ATTORNEYS

United States Patent Office 3,478,172

Patented Nov. 11, 1969

3,478,172

AUTOMATIC TELEPHONE EXCHANGE FOR SUBSCRIBER'S INSTRUMENTS WITH PUSH BUTTON KEYSENDING

Harold John Carl Björk, Hagersten, and Sven Gustav Ingemar Kilander, Stuvsta, Sweden, assignors to Telefonaktiebolaget L M Ericsson, Stockholm, Sweden, a corporation of Sweden Filed June 3, 1965, Ser. No. 460,961

Claims priority, application Sweden, June 9, 1964, 7,005/64

Int. Cl. H04m 3/62

U.S. Cl. 179—18 1 Claim

ABSTRACT OF THE DISCLOSURE

A telephone system includes an exchange and a plurality of subscriber's instruments, each connected via a separate subscriber's line to the exchange. Some of the instruments have digit signalling push buttons, and the exchange has a subscriber's line equipment for each of these instruments. An identifier in the exchange is provided with digit signal receiving relays. Contacts in the line equipment of a calling instrument connect the associated subscriber's line to the digit signal receiving relays when the calling instrument is identified by the identifier. Contact means actuated by the digit signal receiving relays operate cooperatively with the identifier in accordance with its calling line subscriber's line identification, via an intermediate connection, to indicate the called subscriber's line identification. The called subscriber's identification is transmitted directly to a marker for establishing a connection, via selectors, between the calling and called subscriber's lines.

The present invention refers to telephone systems and more particularly to an automatic telephone exchange which services at least some special subscriber's instruments equipped with digit sending push button keys for directly connecting a call to one of these instruments to certain selected instruments.

Such telephone exchanges include subscriber's line equipments, selectors, registers and connecting circuits and an identifier and a marker with known functions. Each of the subscriber's instruments connected to the exchange has its own arrangement for sending digit signals to the registers of the exchange, and each is connected, by means of its subscriber's line to its separate subscriber's line equipment.

Outgoing calls from a subscriber's instrument are generally directed to comparatively few of subscriber's numbers. Persons in a certain official position perhaps often speak with each other, or the traffic within a department in a larger enterprise may be particularly great. Accordingly, there is a desire to be able to connect a limited number of subscriber's instruments directly by means of push-button keys. The subscriber's instruments to which the push-button keys refer are different for different subscribers and it must be possible to select them arbitrarily.

An object of the invention is to provide such subscriber's intruments with the facility of arbitrarily calling different lines directly.

Briefly, the invention contemplates an automatic telephone exchange and at least a group of special subscriber's instruments having digit signal transmitting push-buttons. Added to the regular exchange are digit signal receiving relays in an identifier and contacts in the subscriber's line equipment of the special instruments. These contacts connect the calling special subscriber's line equipment to the digit signal receiving relays when the identifier indicates the calling line. Contact means are actuated by the digit signal receiving relays in response to digit signals when the calling line indication is made. The actuation of the contact means in combination with the identity indication, through a separate connection, indicates the called subscriber's instrument directly to the marker of the exchange which establishes, via one of the exchanges connecting circuits, a communication path between the calling and called lines.

The invention will be described below with reference to the accompanying drawings, FIGS. 1–4.

Figure 4:
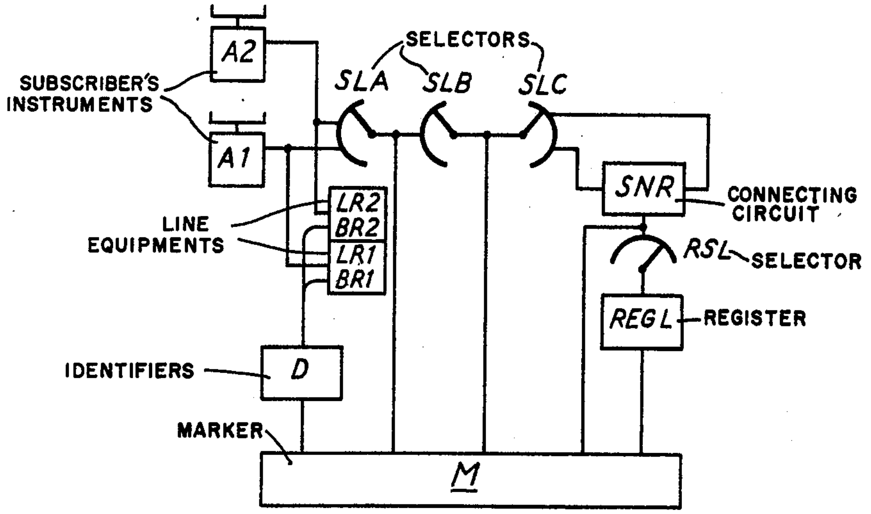
FIG. 4 shows a block diagram of the exchange.

In FIG. 4, A1 and A2 are subscriber's instruments, D an identifier and M a marker. The selecting means of the telephone exchange comprise three selector stages SLA, SLB, SLC connected by means of links. The connecting circuits SNR are connected to the selector stage SLC and are in communication with registers REGL by means of a selector stage RSL. The line equipments LR1/BR1, LR2/BR2 of the subscriber's lines are interconnected and connected with the identifier D and the selector stage SLA. A call from the subscriber's instrument A1 actuates the line equipment LR1/BR1 which in its turn actuates the identifier D. After the called instrument has been identified, the marker M will be connected, and in response to the identification selects and sets a selector SLA. A pair of selectors SLB–SLC, a connecting circuit SNR and a register REGL are selected by the marker. The selectors SLB, SLC and RSL are set in such a way that instrument A1 becomes connected to the register selected. The subscriber hears a dialing tone and sets the register REGL through the agency of the means for sending digit signals, provided in the instrument A1, for example a keyset. After register REGL has received the number of a called subscriber's instrument, for example A2, the register REGL is connected to the marker M. The number of the instrument A2 is transmitted to the marker which selects and sets a selector SLA and a pair of selectors SLB–SLC, so that instrument A2 is connected to the right side of the connecting circuit SNR. Then units M, REGL and RSL will be released so that only the telephone communication passing from instrument A1, through units SLA, SLB, SLC, SNR, SLC, SLB, SLA, to instrument A2 remains.

According to the invention, instrument A1 is a special subscriber's instrument provided with push-button keys for calls to certain other subscriber's instruments, for example, with a push-button key for calls to instrument A2. If the call is made by means of this push-button key, line equipment LR1/BR1 will be actuated. The subscriber's line is connected to the identifier D and a relay means therein senses the condition of the instrument A1. Then, identifier D obtains a signal from instrument A1, indicating that the instrument A2 is being called. At the same time, instrument A1 will be identified and the identification is combined with the received signal. The combination indicates the number of the subscriber's instrument A2. This number is transmitted to the marker that establishes the telephone connection between A1 and A2.

Without leaving the fundamental idea of the invention the marker M can select, after receiving the number of the instrument A1 from the identifier D, a free register REGL and transmit the number of instrument A2 from the identifier D to this register, simultaneously as a connection between instrument A1 and the selected register is set up through units SLA, SLB, SLC, SNR and RSL. Then the marker M is released but is again marked busy by the register REGL, receives again the number of A2, this time from REGL, and establishes the telephone connection as has been described above. Registering means for the subscriber's number of instrument A2 must always be found in the registers REGL and, as only one connection at a time may be carried out by means of the selector stages, the telephone communication must always be established in two phases, i.e. first the instrument A1 is connected to connecting circuit SNR and then connecting circuit SNR to instrument A2.

Figure 1:
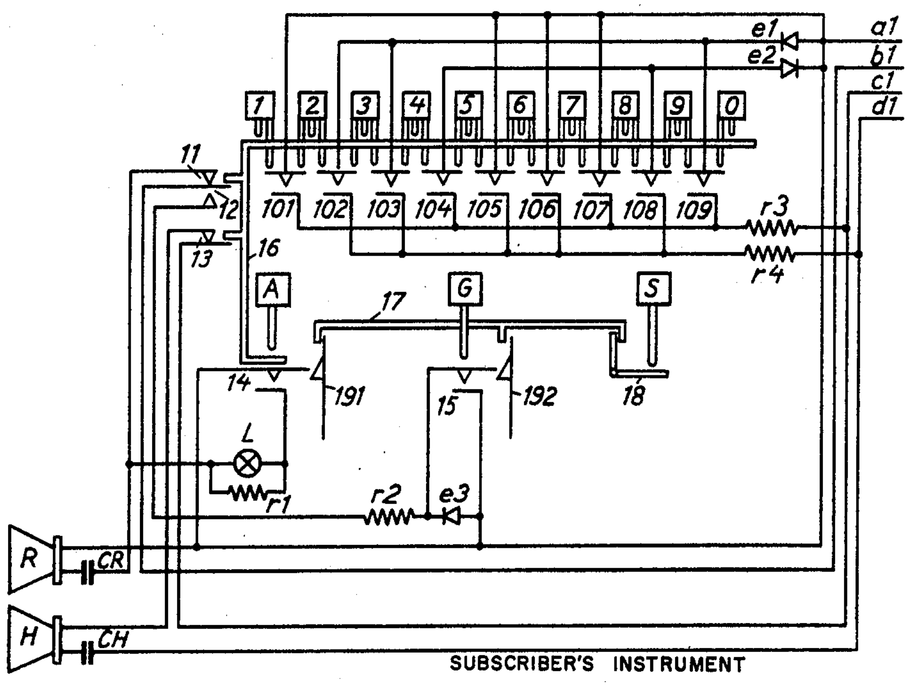
FIG. 1 shows a special subscriber's instrument according to the invention.

In the special subscriber's instrument according to FIG. 1, H is a loudspeaker used as microphone and R is a loudspeaker used as telephone receiver, CH and CR are capacitors, L a signal lamp, *e*1-*e*3 rectifiers and *r*1-*r*4 are resistances. For sending of signals which indicate digits, ten push-button keys 1–0 are found. Furthermore there are provided a calling key A, a release key S and a key G for group selection. All push-button keys are non-locking, but among those contacts which are actuated by the push-button keys, contacts 14 and 15 are provided with a detent spring 191 and 192 respectively and are restored by means of the release key S.

The subscriber's instrument is intended to be connected to a telephone exchange by means of 4-wire lines *a*1, *b*1, *c*1, *d*1, a pair of lines for each speech direction being presupposed. Digit sending occurs by means of the push-button keys 1–0 which connect the rectifiers *e*1, *e*2 and the resistances *r*3, *r*4 between the line wires *a*1, *b*1, *c*1, *d*1 in different combinations as will be described below. Common for the calling key A and the keys 1–0 there is found a driver 16 which actuates the contacts 11–14 when one of these keys is pressed. The release key S actuates a lever 18 and a driver 17 which moves the detent springs 191, 192 aside. By means of the ten digit keys 1–0, ten different digit signals may be sent. By means of the group key G a signal that is independent of the 10 digit signals can be sent so that the number of different signals may be increased to 20.

Figure 2:
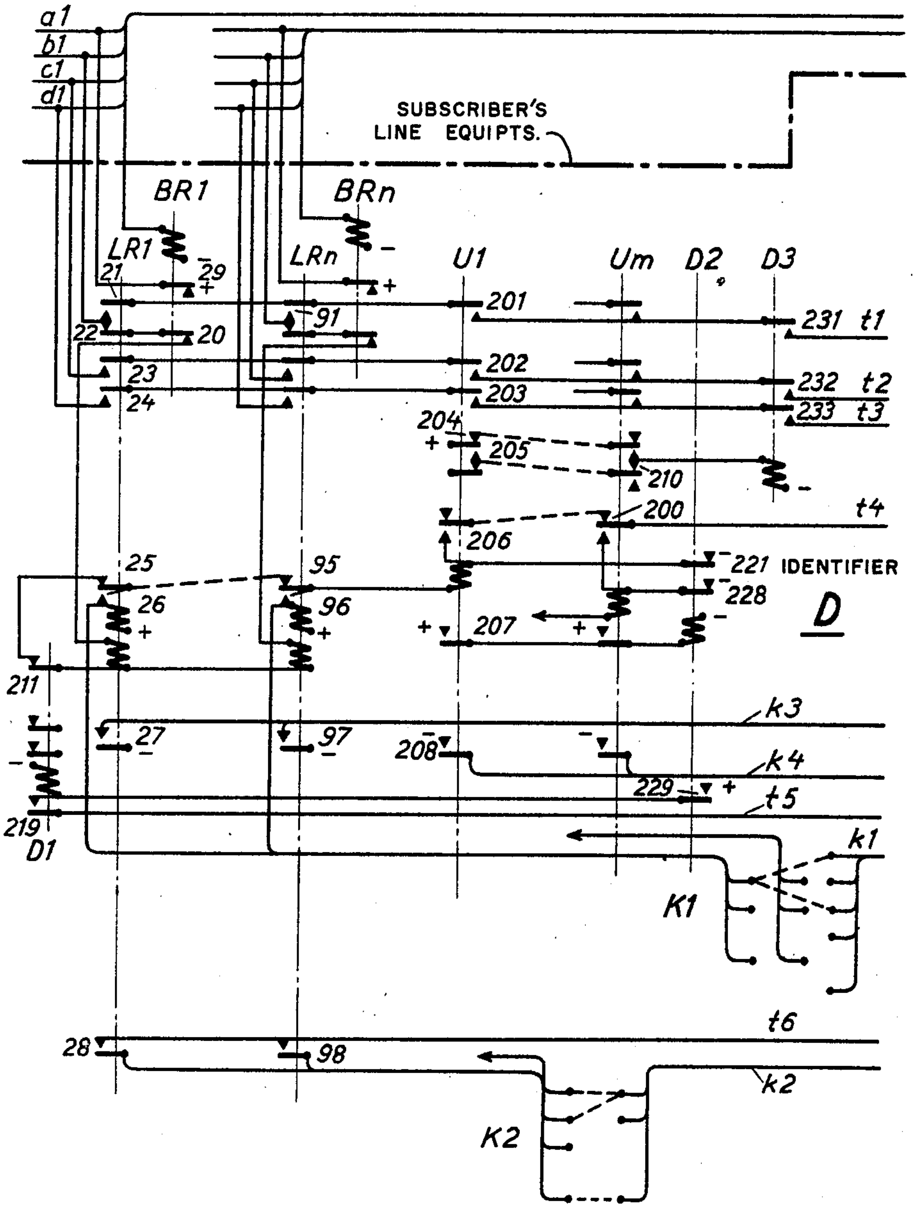
FIG. 2 shows subscriber's line equipments and group relays and intermediate connections of the identifier.

In FIG. 2, LR1, BR1 . . . LR*n*, BR*n* are subscriber's line equipments. LR1–LR*n* are calling relays and BR1–BR*n* are cut-off relays. N-subscriber's lines can form a group. Each such group has a group relay U1-U*m*. The calling relays within each group form a relay chain in which only one relay at a time may be operated. The group relays U1-U*m* also form a relay chain within which only one relay at a time may be operated. K1 and K2 are intermediate connections.

Figure 3:
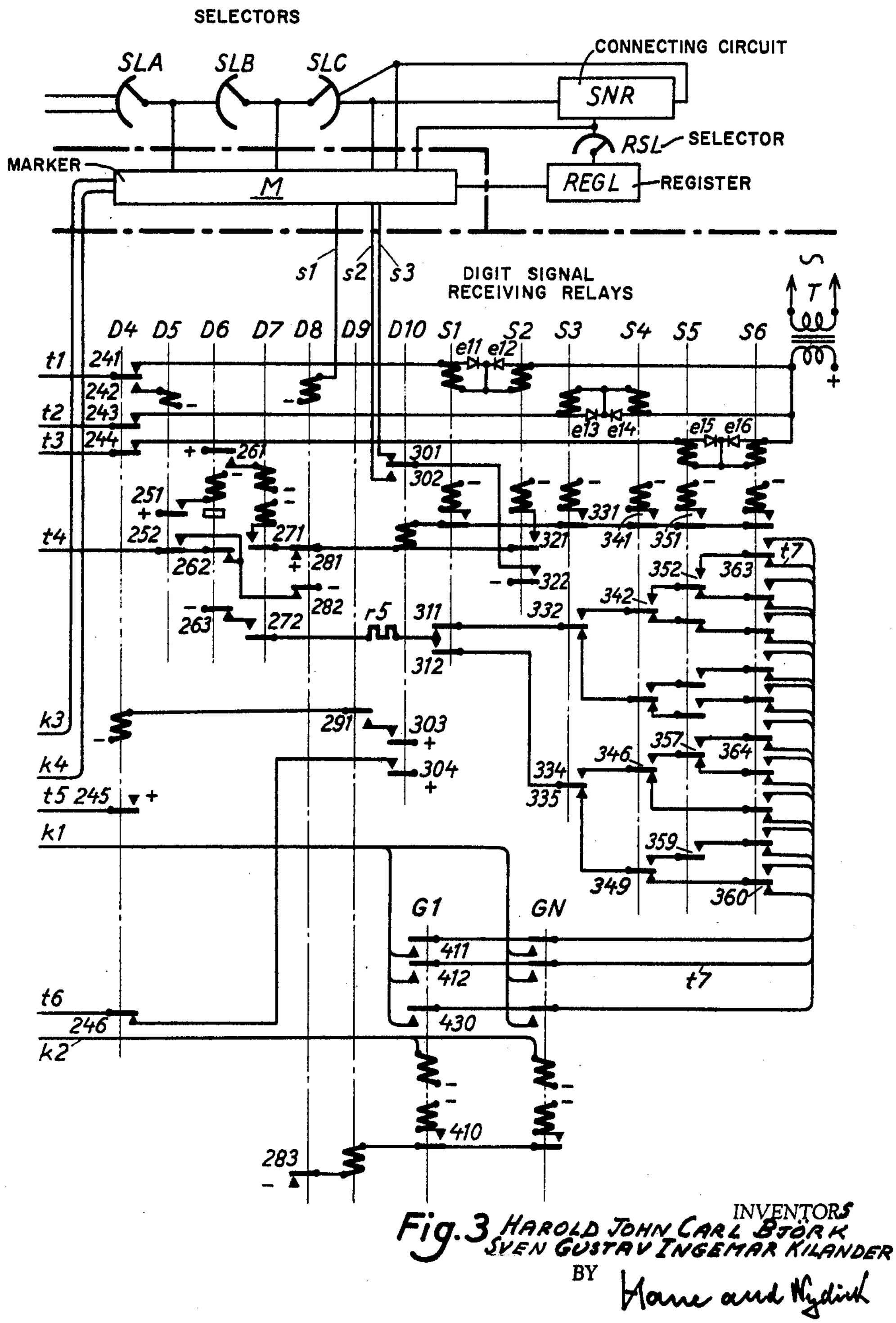
FIG. 3 shows relays in the identifier and connections to the marker of the exchange, and selectors, connecting circuits and registers.

In FIG. 3, S–S6 are signal receiving relays and *e*11-*e*16 are rectifiers. G1–GN are number group relays which usually may be common for a plurality of subscribers. Furthermore, a number of auxiliary relays D1–D10 are included in the identifier D. The intermediate connection K1 connects, in the identifier, received digit signals to the subscriber's line equipment that is intended by the signal. The intermediate connection K2 joins subscribers who have direct calls by means of the push-button keys 1–0 and G to the same subscriber's instruments, into one group having a common relay G1–GN.

Common calls from the subscriber's instrument shown in FIG. 1 are started by pressing the calling key A. The contacts 11–14 are actuated. The key A is kept pressed until a tone is heard in the loudspeaker R. The following circuit is closed: terminal +, the contact 29 (FIG. 2), the wire *a*1, the rectifier *e*3 (FIG. 1), the resistance *r*2, the contact 12, the wire *b*1, the contacts 22 and 20 (FIG. 2), the lower winding of the relay LR1, the contacts 211, 25 . . . 95, the winding of the group relay U1, the contact 221, to a negative terminal. The calling relay LR1 operates. The contacts 21–28 are actuated. The relay U1 operates in a circuit passing through the contacts 221, 95, 26 and the upper winding of LR1. The contacts 201–208 are actuated. The relay D2 operates by means of current passing through the contact 207. The contacts 221–229 are actuated. The relay D1 operates in a circuit passing through the contact 229. The contacts 211–219 are actuated. The relays U1 and LR1 are held by means of current passing through the contacts 282, 262, the wire *t*4, the contact 200, 206, 95 and 26. The relay D3 operates in a circuit passing through the contacts 205–210. The contacts 231–233 are actuated.

The relays LR1 and U1 indicate, in combination, the identity of the calling subscriber's instrument, and the relay D3 connects the identified instrument to the signal receiving relays S1–S6 in FIG. 3 by means of the wires *t*1–*t*3 and the break contacts 241, 243, 244. The signals are produced by means of alternating current supplied through the transformer T. The following circuit is completed: terminal +, the contact 29, *a*1, the rectifier *e*3, the resistance *r*2, the contact 12, *b*1, the contacts 21, 201, 231, the wire *t*1, the contact 241, the rectifier *e*11, the upper winding of the relay S2, the lower winding of the transformer T, to terminal +. Only those half proriods of the alternating current which pass through the rectifier *e*3 are allowed to pass and only the relay S2 operates. The contacts 321–322 are actuated. The marker M is called by means of a circuit passing through the contacts 322, 301 and the wire *s*3. If the marker is free, the wires of the bundles of wires *k*3 and *k*4 will be connected to marker M by means of connecting relays which belong to the marker and are not shown in the figure. The circuit is closed from the contacts 27 and 208 to the marker whereby the calling subscriber's line is indicated for setting a selector SLA that is selected by the marker, simultaneously as a register REGL, a connecting circuit SNR and selectors SLB and SLC are selected. The calling subscriber is connected to the register REGL and hears dialing tone. Then the calling key A will be released. The contacts 11–13 are restored while the contact 14 is locked by the detent spring 191. The lamp L will be ignited when contact 11 closes. The cut-off relay BR operates. The contacts 29 and 20 are actuated.

When the marker M has established the connection, the relay D8 will be operated in a circuit passing through the wire *s*1. The contacts 281–283 are actuated. The relays S2, LR1 and U1 release their armatures, whereby the identifier D and the marker M are released. The subscriber then sends digit signals to the register REGL by means of the push-button keys 1–0.

The keyset according to FIG. 1 is so designed that each of the push-button keys 1–0 actuates on the one hand one or two contacts, and on the other hand the driver 16. The key 1 thus closes a circuit passing from the wire *a*1, the contact 101, the resistance *r*3, to the wire *c*1. The key 2 closes two circuits, viz. The same as the key 1 and a circuit passing from wire *α*1, through the rectifier *e*1, the contact 102 and the resistance *r*4, to the wire *d*1. The key 3 closes only the last mentioned circuit passing through rectifier *e*1 and resistance *r*4 while the key 4 closes a circuit passing through the rectifier *e*2, the contact 104 and the resistance *r*3 and closes furthermore the circuit passing through rectifier *e*1, contact 103 and resistance *r*4, connected by the key 3. The key 5 closes said circuit passing through rectifier *e*2 and resistance *r*3 and a circuit passing from wire *a*1 to wire *d*1 through contact 105, and the resistance *r*4. The keys 6–0 give other mutually different combinations. In the registers REGL, signal receiving relays are found which correspond to the relays S1–S6 in FIG. 3. After the register has received the number of a called subscriber's instrument, a telephone connection is established as has been described above. During the conversation the lamp L in a holding circuit of the connecting circuit SNR is glowing. After the end of the conversation the release key S is pressed. The contact 14 is released and the lamp L goes out.

Besides common telephone calls according to the above description, it should be possible, according to the invention, to call directly by means of the keys 1–0 and G in FIG. 1 a number of separately selected telephone instruments by means of only a push on one of the keys 1–0. For such calls the calling key A is not pressed.

As an example, it is assumed that the push-button key 8 in FIG. 1 is pressed and is kept pressed until a tone, suitably a ringing tone, is heard in the telephone receiver R. The key 8 in the instrument according to FIG. 1 is supposed to refer to the telephone instrument corresponding to the relay LR*n* in FIG. 2. The driver 16 is operated by the key 8 and the contacts 11–14 are actuated by the driver 16 which causes a call in conformity with the description above when the key A is pressed. At the same time, the contacts 107 and 108 will be closed and, when the relays S1–S6 in the identifier are connected to the line wires *b*1, *c*1, *d*1 the following circuits are closed: terminal +, the contact 29, the wire a 1, on one hand passing through the contact 107 and the resistance *r*3, the wire *c*1, the contacts 23, 202 and 232, the wire *t*2, the contact 243, the windings of the relays S3 and S4, and on the other hand through the rectifier *e*2, the contact 108, the resistance *r*4, the wire *d*1, the contacts 24, 203 and 233, the wire *t*3, the contact 244, the winding of the relay S5; the transformer T, to terminal +. The relays S3, S4 and S5 operate. The contacts 331–335, 341–349 and 351–359 are actuated. Simultaneously, the relay S2 operates in the earlier described calling circuit passing through the rectifier *e*3, the resistance *r*2 and the contact 12 in FIG. 1. The contacts 321–322 are actuated. The relay D10 operates in the following circuit: terminal +, the contact 281, the winding of D10, the contact 331 respectively 341 and 351, the lower windings of the relays S3, S4 and S5, to a negative terminal. The contacts 301–304 are actuated. The relays D10, S3, S4 and S5 are held. The relay G1 operates in the following circuit: terminal +, contacts 304 and 246, the wire *t*6, the contact 28, the intermediate connection K2 and the bundle of wires *k*2, the upper winding of G1, to a negative terminal. The contacts 410–430 are actuated. The relay D9 operates by means of current passing through the lower winding of relay G1 and the contacts 410 and 283. The contact 291 is actuated. The relays G1 and D9 are held dependent on the break contact 283. The relay D4 operates in a circuit passing through the contacts 303 and 291. The contacts 241–246 are actuated. The setting circuit of relays S1–S6 and of relays G1–GN are interrupted and the relay D1 is held in a circuit passing through the contact 245, the wire *t*5 and the contact 219.

The marker M is called and is marked busy, in known manner, by means of a circuit passing from a negative terminal, the contacts 322 and 302 and the wire *s*2. The marker connects the bundles of wires *k*3 and *k*4 and receives information about the identity of the calling subscribe's line by means of circuits passing from the contacts 27 and 208. Then, the marker selects a free connecting circuit SNR, a selector SLA and a pair of selectors SLB–SLC and connects the calling subscriber's line to the input side of the selected connecting circuit without connecting the connecting circuit to any register REGL.

Simultaneously as the marker is marked busy, the relay D5 operates in the identifier by means of the following circuit: terminal +, the contact 29, the wire *a*1, the rectifier *e*3, the resistance *r*2, the contact 12, the wire *b*1, the contacts 21, 201 and 231, the wire *t*1, the contact 242, the winding of D5, to a negative terminal. The contacts 251–252 are actuated. The slow releasing relay D6 operates. The contacts 261–265 are operated. The relay D7 operates by means of current passing through its upper winding and the contact 261. The contacts 271–272 are actuated. Then, relay D7 is held by means of current passing through its lower winding and the contacts 271–281. The circuit passing through the wire *t*4 which holds the identifying relays U1 and LR1, is changed from the contact 262 to the contact 252.

When a connecting circuit SNR is connected to the calling subscriber's line, the cut-off relay BR1 operates.

The contacts 29 and 20 are actuated. The circuit of the relay D5 is interrupted. The relay D5 releases its armature. The holding circuit of the relays U1 and LR1 is interrupted by the contact 252 and is held interrupted during the release time of relay D6. The relays U1 and LR1 release their armatures. When the relay D6 releases its armature the following circuit is closed: a negative terminal, the contacts 263, 272, the resistance *r*5, the contacts 311, 332, 342, 352, 363, the wire *t*7, the contact 412, the bundle of wires *k*1, the intermediate connection K1, the upper winding of the relay LR*n*, to a positive terminal. The relay LR*n* operates. The contacts 91–98 are actuated. The relay U1 operates in a circuit passing through the contacts 221 and 96. The relays LR*n* and U1 are held in the circuit passing through the contacts 206, 262, 282 and the identity of the called subscriber's line is indicated for the marker M by means of the contacts 97 and 208. The marker now sets up a connection between the called subscriber's instrument and the output side of the earlier selected connecting circuit SNR. Then the relay BR*n* operates. The marker releases itself by means of a current impulse passing through the wire *s*1, whereby the relay D8 operates, the contacts 281–283 are actuated and the identifier is released.

A telephone communication has thus been set up between the calling subscriber's instrument according to FIG. 1 and the subscriber's instrument corresponding to the key 8 in this instrument. Ringing tone is sent out from the connecting circuit SNR and the calling subscriber releases the key 8.

In a subscriber's instrument according to FIG. 1 only 10 keys 1–0 are required for digit sending. It may however be desirable to be able to call more than ten other subscriber's instruments directly without separate digit sending. This is rendered possible by means of the push-button key G that actuates the contact 15. After a short push on the key G the contact 15 will be held in closed condition by the detent spring 192. The rectifier *e*3 is short-circuited by the contact 15, which implies that the relay S1 in FIG. 3 operates simultaneously with the relay S2. If then the calling key A is pressed, a subscriber's instrument that is indicated by a circuit passing through the contacts 263, 272, 312, 335, 349, 360 will be called. If the key 8, instead of A, is pressed, another subscriber's instrument is indicated by means of a circuit passing through the contacts 263, 272, 312, 334, 346, 357 and 364.

By means of the intermediate connection K2 a number of arbitrarily selected subscriber's instruments may be joined to a group having a common group relay G1–GN. The keys of these instruments are intended for calls to the same subscriber's lines and by means of the intermediate connection K1 is determined which of these subscriber's lines it should be. Subscriber's instruments which belong to different group relays G1–GN, call different subscriber's lines by means of their keys 1–0 and G.

We claim:

1. In an automatic telephone system, an exchange, a plurality of subscriber's instruments each having a separate subscriber's line connecting the instrument to said exchange; at least a group of said instruments having a push-button keyset for sending digit signals and an additional key for initiating a call, a subscriber's line equipment in said exchange for each of said group of instruments; selectors, registers, connecting circuits, an identifier and a marker in said exchange; digit signal receiving relays in said identifier; circuit controlling means associated with said digit signal receiving relays and operating when said additional key initiates a call; contacts in said line equipments for connecting a calling subscriber's line to said digit signal receiving relays for each call from said line when the identity of said line is indicated in the identifier; contact means actuated by said digit signal receiving relays when there is a digit signal marked on the calling subscriber's line by said push-button keyset, said contact means operating in combination with the indicated identity through an intermediate connection indicating a called subscriber's line whose identity is transmitted directly to the marker for setting a telephone communication, via said selectors and one of said connecting circuits, between said calling and said called line; and a circuit closed by said circuit controlling means for transmitting a signal to said marker for the setting of a connection between the calling line and one of said registers.

References Cited

UNITED STATES PATENTS

| | | | |
|---|---|---|---|
| 2,554,201 | 5/1951 | Lundkvist | 179—90.3 |
| 3,211,835 | 10/1965 | Grundin et al. | |

KATHLEEN H. CLAFFY, Primary Examiner

T. W. BROWN, Assistant Examiner

U.S. Cl. X.R.

179—90